(12) United States Patent
Rosen et al.

(10) Patent No.: US 7,537,253 B2
(45) Date of Patent: May 26, 2009

(54) METHOD FOR ATTACHING A POLISHED METAL GRILLE SURROUND

(75) Inventors: David B. Rosen, Flower Mound, TX (US); Joseph F. Marrs, Aubrey, TX (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 11/863,012

(22) Filed: Sep. 27, 2007

(65) Prior Publication Data

US 2009/0085361 A1    Apr. 2, 2009

(51) Int. Cl.
*B60R 19/52* (2006.01)

(52) U.S. Cl. ...................... 293/115; 180/68.4

(58) Field of Classification Search ........... 296/115, 296/155, 193.09, 203.02, 193.1, 1.08; 180/68.4
See application file for complete search history.

(56) References Cited

U.S. PATENT DOCUMENTS

| | | | | |
|---|---|---|---|---|
| 2,501,065 A * | 3/1950 | Longeway | ............... | 180/68.6 |
| 2,769,501 A | 11/1956 | Wagner | | |
| 3,650,584 A * | 3/1972 | Goetz et al. | ............... | 312/7.2 |
| 4,285,103 A * | 8/1981 | Inamoto | ............... | 411/508 |
| 4,403,648 A * | 9/1983 | Styok | ............... | 180/68.6 |
| 5,437,133 A * | 8/1995 | Pliml | ............... | 52/456 |
| 5,865,500 A | 2/1999 | Sanada | | |
| 5,941,329 A | 8/1999 | Ichioka | | |
| 6,186,583 B1 * | 2/2001 | Martin | ............... | 296/193.09 |
| 6,206,438 B1 * | 3/2001 | Pueyo | ............... | 293/115 |
| 6,298,908 B1 * | 10/2001 | Harrell et al. | ............... | 165/69 |
| 6,422,643 B1 | 7/2002 | Pease | | |
| 6,622,808 B2 * | 9/2003 | Sasano et al. | ............... | 180/68.3 |
| 6,659,220 B2 | 12/2003 | Kobayashi | | |
| 6,695,395 B2 | 2/2004 | Kallio | | |
| 7,044,517 B2 | 5/2006 | Hyuga | | |
| 7,059,031 B1 * | 6/2006 | Elwell et al. | ............... | 293/115 |
| 7,073,849 B1 | 7/2006 | Nunes | | |
| 7,246,832 B2 * | 7/2007 | Cobble et al. | ............... | 293/115 |
| 7,303,219 B2 * | 12/2007 | Trabant et al. | ............... | 293/155 |
| 2005/0093341 A1 | 5/2005 | Aigner | | |

* cited by examiner

*Primary Examiner*—Kiran B. Patel
(74) *Attorney, Agent, or Firm*—Christensen OConnor Johnson Kindness PLLC

(57) ABSTRACT

A grille surround (2) for a vehicle (10) includes a shell (30) formed from sheet metal and a backing structure (40). An adhesive (50) is disposed between the shell (30) and the backing structure (40) to fixedly secure the shell (30) to the backing structure (40). The backing structure (40) is attached to the vehicle (10) thereby securing the shell (10) to the vehicle (10). The disclosed configuration allows the shell (10) to be secured to the vehicle (10) without using fasteners that would be visible from the outside of the vehicle.

11 Claims, 4 Drawing Sheets

METHOD FOR ATTACHING A POLISHED METAL GRILLE SURROUND

BACKGROUND

A vehicle grille is generally mounted to the front of the vehicle so that the grille covers an opening into the engine compartment. The grille has a pattern of smaller openings passing therethrough so that air passes through the grille and into the engine compartment to cool the vehicle engine. While the openings in the grille are large enough and of sufficient number to allow the required air flow into the engine compartment, the are generally small enough to provide protection against foreign objects and debris entering the engine compartment, where they could damage the vehicle radiator and other engine components. The grille may also serve an aesthetic function, being formed to provide a desired appearance when mounted on the vehicle. Consequently, the design of vehicle grilles is determined not only by function, but also by appearance.

Vehicle grilles can be manufactured from a wide range of materials and using a variety of manufacturing techniques in order to provide a desired appearance. For example, some grilles are formed from molded polymeric materials, while other grilles comprise assemblies made from a plurality of metal components. In addition, some grilles are painted to match the color of the vehicle. If a highly reflective finish is desired, chrome may be applied to the grille. Alternately, if the grille is formed from metal, the metal may be polished to create the highly reflective finish.

Grille surrounds are often mounted to the vehicle to surround the periphery of the grille and provide an aesthetically pleasing transition between the grille and the body of the vehicle. A grille surround can have any of a variety of configurations depending on the desired appearance. Some grille surrounds cover the edges of the grille so that the edges are not visible from the exterior of the vehicle. Other grille surrounds cover the fasteners that attach the grille to the vehicle so that the fasteners are not visible from the exterior of the vehicle. As with the grilles, the grille surrounds can also have various finishes to provide a desired appearance. Among the possible finishes are paint and a highly polished reflective finish.

A reflective finish can be obtained by any of a number of methods. For example, a layer of chrome can be applied to the grille surround. However, applying chrome represents an additional manufacturing step and added cost. If the grille surround is formed from metal, the surface of the grille surround can be highly polished to provide the reflective finish, and the cost and time associated with applying a chrome finish can be avoided.

In some instances, it is desirable to attach the grille surround to the vehicle so that no fasteners or other means of attachment are visible from the exterior of the vehicle. In these instances, the surround may be formed from a flat sheet of metal and have brackets or threaded fastening means welded to the back surface thereof to provide a means by which the surround may be mounted to the vehicle. This configuration works well when the grille surround is to be painted or when chrome is to be applied thereto. However, such a configuration is undesirable when the metal of the grille surround is to be highly polished to provide a reflective finish. When grille surrounds having such a configuration are polished, the welds tend to "read through" to the front surface of the grille surround. That is, evidence of the welds is visible on the highly polished front surface of the grille surround, providing an undesirable appearance.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A grille surround is adapted to surround at least a portion of the periphery of a vehicle grille. The grille surround includes a shell formed from sheet metal to have one or more flanges extending in a rearward direction. In one embodiment, the grille surround may be polished. The flanges are shaped to surround at least a portion of the vehicle grille. The grille surround further includes a backing structure with an attachment means for securing the backing structure to the vehicle. The backing structure is fixedly secured to the shell with an adhesive.

In various embodiments, the attachment means for securing the backing structure to the vehicle may include, but is not limited to, threaded fasteners, mechanical fasteners, threaded holes, holes with threaded inserts disposed therein, slots, deformable clips, and adhesives.

DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION

Figure 1:
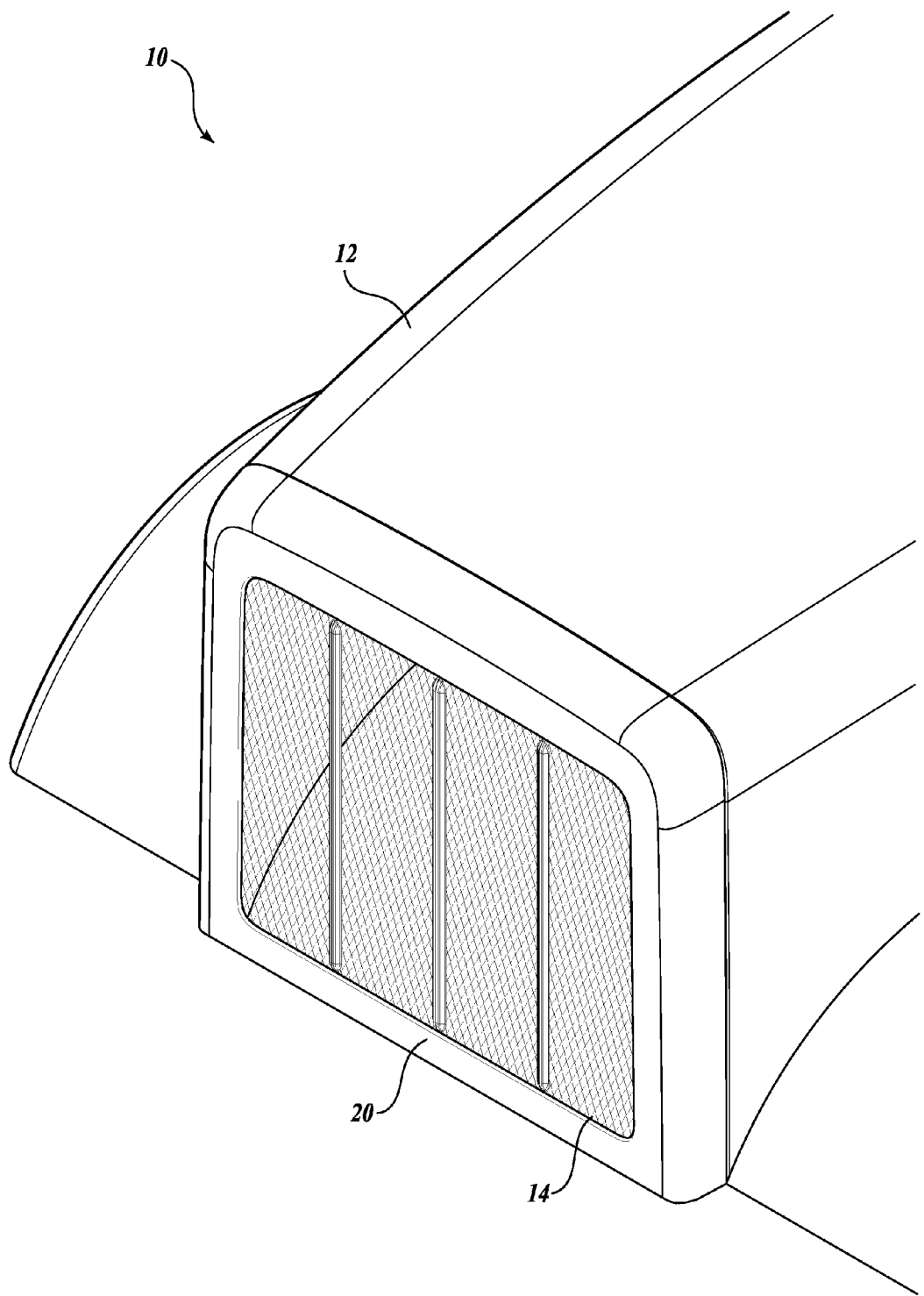
FIG. 1 is an isometric view of one embodiment of a grille surround of a heavy duty truck.

As shown in FIG. 1, a vehicle 10 includes a hood 12 defining at least a portion of an engine compartment for housing the vehicle the engine (not shown). One or more openings are located in the forward portion of the hood 12 so that the interior of the engine compartment is in fluid communication with air outside and forward of the hood 12. A grille 14 is secured to the vehicle 10 and is positioned to cover the opening in the forward portion of the hood 12. The grille 14 includes a pattern of openings to allow air to pass through the grille 14 into the engine compartment in order to cool the vehicle engine. While the embodiment of a grille 14 illustrated and described herein is depicted as the front grille of a Class 8 heavy duty truck, it should be understood that the presently described system and method for attaching a grille surround is suitable for use on a wide variety of vehicles having various grille configurations and locations.

Still referring to FIG. 1, a grille surround 20 is mounted to the vehicle 10 so that the grille surround 20 is positioned around at least a portion of the periphery of the grille 14. The interface between the grille surround 20 and the grille 14 can be varied according to the desired appearance. For example, in one embodiment, the grille surround 20 overlaps the edge of the grille 14 so that the grille 14 appears recessed behind the grille surround 20. In another embodiment, the grille 14 overlaps the edge of the grille surround 20 so that the grille surround 20 appears recessed behind the grille 14. In yet another embodiment, the edge of the grille surround 20 is flush with the edge of the grille 14 to provide a smooth transition therebetween. Further, the grille surround 20 may surround the entire periphery of the grille 14, or only a portion thereof.

Figure 2:
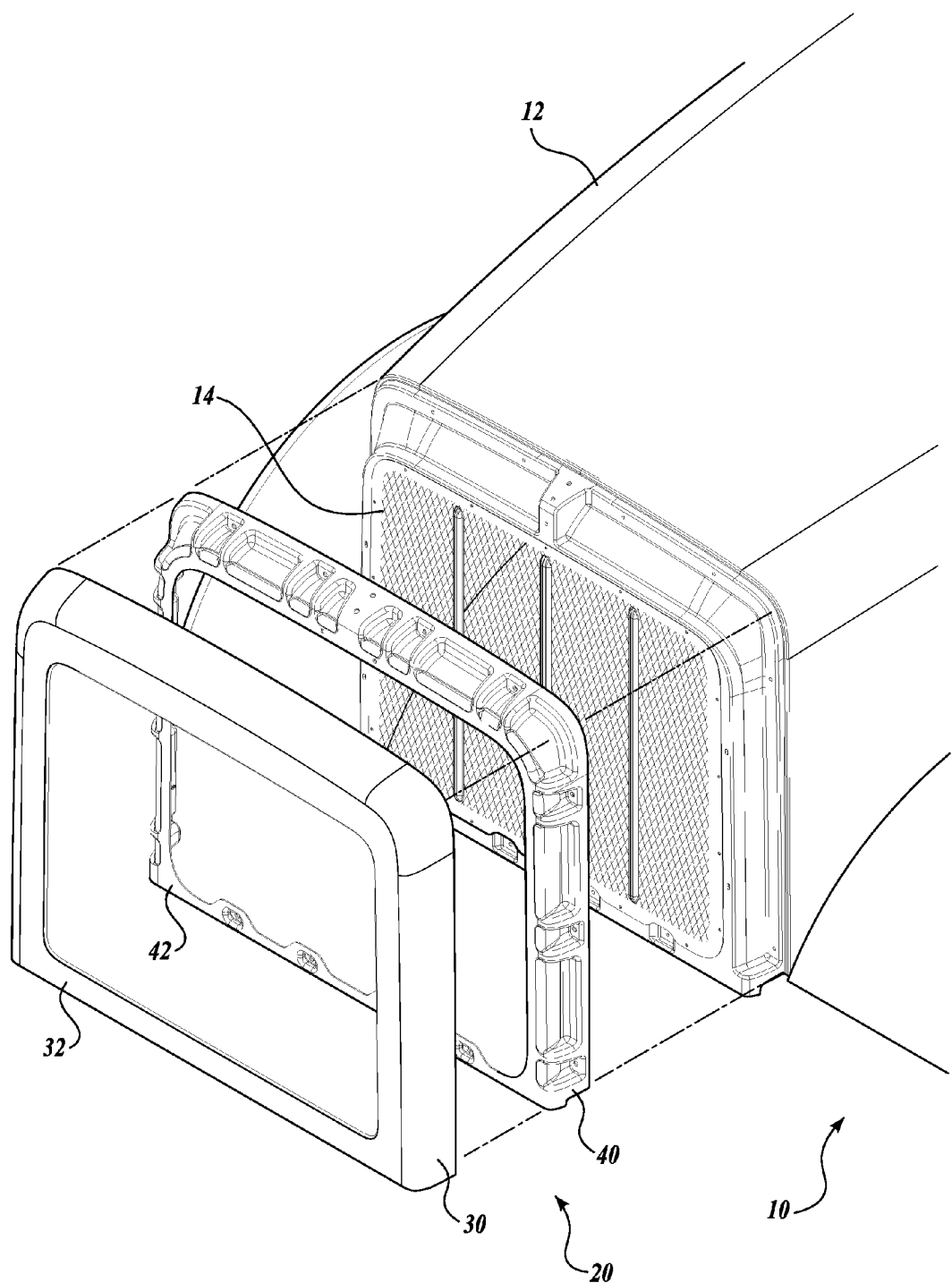
FIG. 2 is a partially exploded isometric view of the grille surround of FIG. 1.
Figure 3:
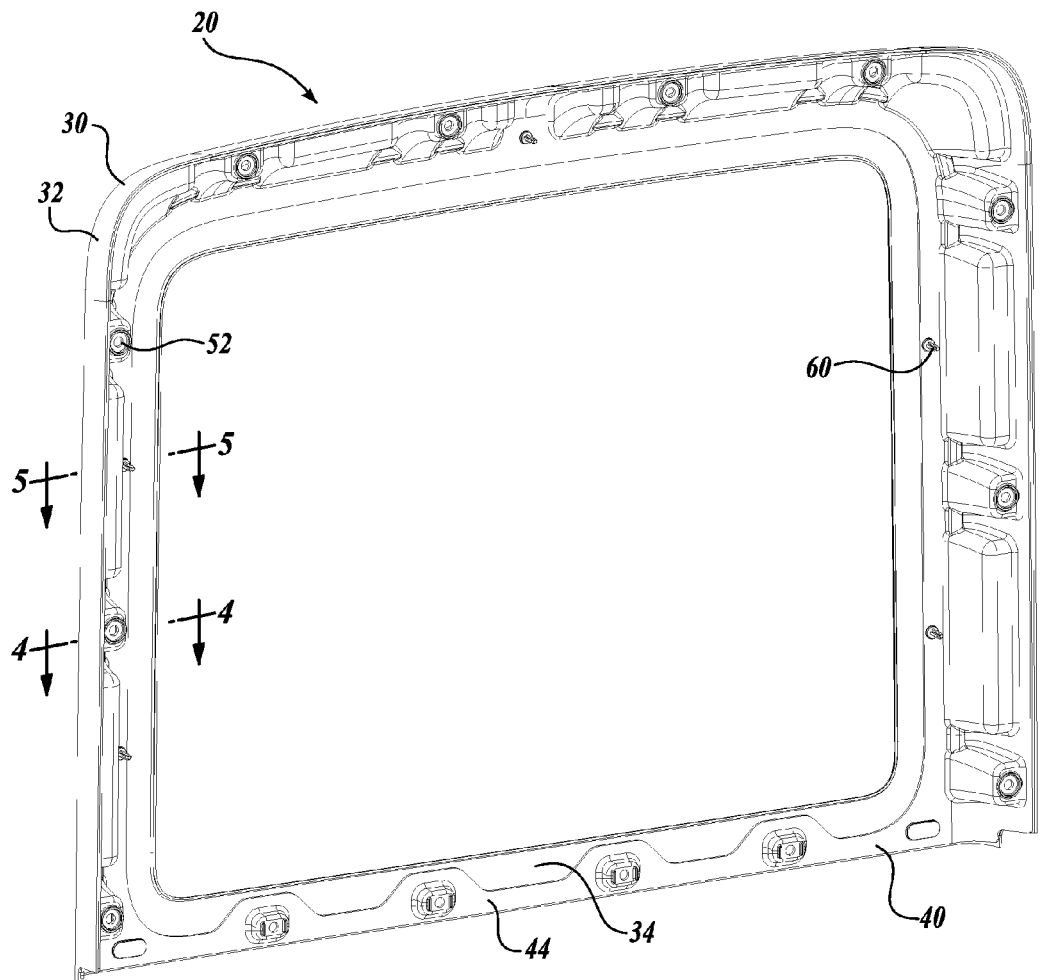
FIG. 3 is a rear isometric view of the grille surround of FIG. 1.

Referring now to FIGS. 2 and 3, the grille surround 20 will be described in more detail. As best shown in FIGS. 2 and 3, the grille surround 20 comprises a shell 30 fixedly attached to a backing structure 40. The shell 30 comprises sheet metal having a forward surface 32 and a rear surface 34. In one embodiment, the shell 30 is formed from aluminum alloy sheet. One or more flanges are formed around the periphery of the shell 30 to extend in a rearward direction (i.e., in the direction of the engine when mounted to the vehicle) so that the shell has a generally concave shape. The one or more flanges are formed by known methods such as stamping, stretch forming, draw forming, or any other method suitable for forming sheet metal.

When the grille surround 20 is attached to the vehicle 10, the forward surface 32 of the shell 30 is visible from the exterior of the vehicle 10, and the rear surface 34 of the shell 30 is generally not visible. Accordingly, at least the forward surface 32 of the shell 30 is provided with a desired appearance. In one embodiment, the forward surface 32 of the shell 30 is polished to have a highly reflective mirror finish. In an alternate embodiment, the shell 30 is anodized to have a desired color and to protect against corrosion. In yet another embodiment, the forward surface 32 of the shell 30 has a texture, such as diamond plating, formed thereon. It should be appreciated that any known finish may be applied to the forward surface 32 of the shell 30 to provide a desired appearance without departing from the scope of the disclosed grille surround 20.

Still referring to FIGS. 2 and 3, the backing structure 40 includes a forward surface 42 and a rear surface 44. The forward surface 42 is formed to be complementary to the rear surface 34 of the shell 30 so that the backing structure 40 can be positioned to nest within the shell 30.

The backing structure 40 is formed from a material with mechanical properties suitable for securing the shell 30 to the vehicle 12. In one embodiment, the backing structure is formed from a polymeric material. In another embodiment, the backing structure is formed from a thermoplastic alloy blend of polybutylene terephthalate (PBT) and polycarbonate (PC) with approximately 30% glass fiber reinforcement. Other embodiments include other composite or metal backing structures. It should be understood that any material having suitable properties may be used. Properties that may be considered when selecting a material include strength, durability, dimensional stability, thermal coefficient of expansion, and ease of manufacture.

The backing structure 40 is manufactured by known methods suitable for the particular material from which the backing structure 40 is formed. Manufacturing methods for polymeric materials include, but are not limited to, injection molding, vacuum forming, and machining. Manufacturing methods suitable for metallic materials include, but are not limited to, machining, casting, forging, stamping, stretch forming, draw forming, or any other method suitable for the particular material.

Figure 4:
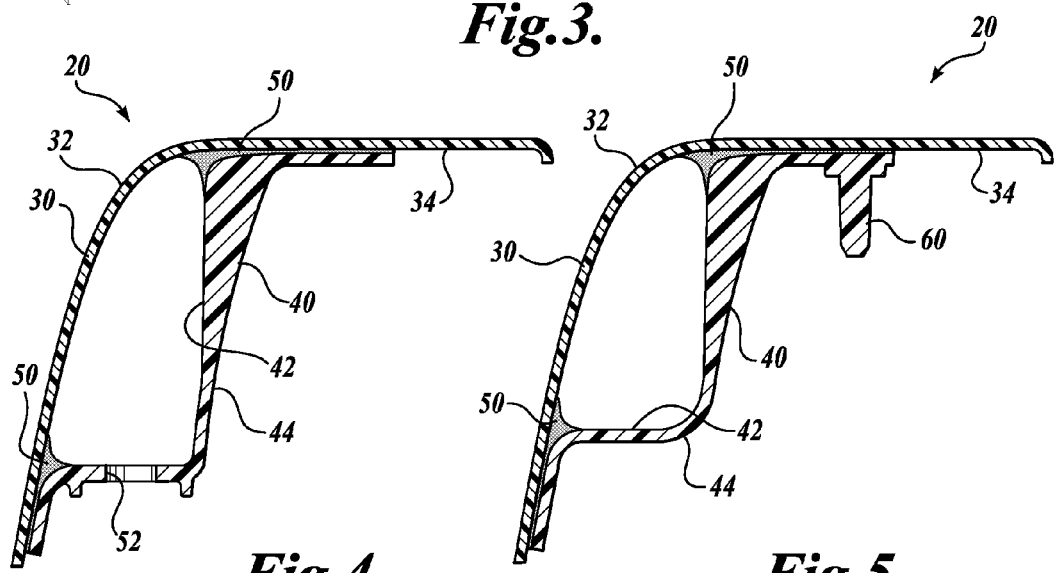
FIG. 4 is a cross-sectional view of the grille surround taken along line 4-4 of FIG. 3.
Figure 5:
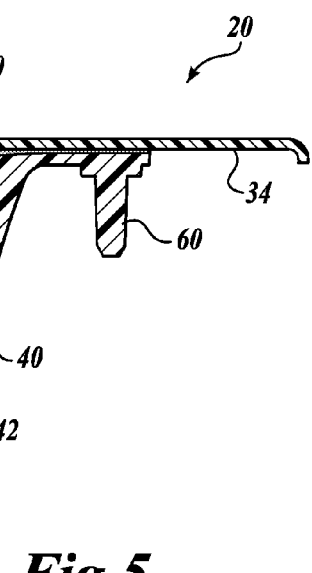
FIG. 5 is a cross-sectional view of the grille surround taken along line 5-5 of FIG. 3.

As best shown in FIGS. 4 and 5, the backing structure 40 may be fixedly attached to the shell 30 with an adhesive 50. More specifically, the backing structure 40 is nested within the shell 30, and adhesive is disposed therebetween so that the adhesive secures at least a portion of the rear surface 34 of the shell 30 to a corresponding portion of the forward surface 42 of the backing structure 40. The adhesive can be of any suitable type, including, but not limited to, contact adhesives, thermoplastic adhesives, and reactive adhesives, such as epoxy. In one embodiment, the adhesive is a two-part methacrylate adhesive.

The use of an adhesive 50 to attach the tacking structure 40 to the shell 30 provides several advantages over currently known grille surrounds. One advantage is that the backing structure 40 is attached to the shell 30 without the use of fasteners that penetrate the shell so as to be visible from the exterior of the vehicle 10. Although some currently known grille surrounds do not include visible fasteners, they do so by having brackets, clips or other attachment hardware welded to the shell or formed thereon. These grille surrounds have disadvantages in that the welds may "show through" to the front surface of the shell, diminishing the aesthetic appearance of the grille surround. Further, these brackets and other attachment hardware, whether welded to the shell or formed thereon, add complexity and cost to the manufacturing process. In contrast, once the shell 30 of the presently disclosed grille surround 20 is manufactured by a sheet metal forming process, no further bracketry is required to attach it to the backing structure 40.

Figure 6:
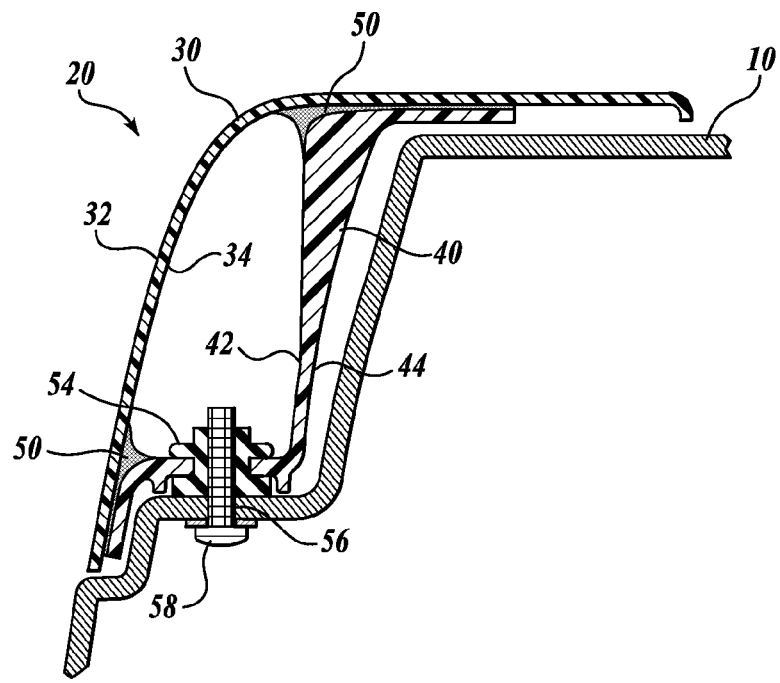
FIG. 6 is a cross-sectional view of the grille surround of FIG. 3 installed on a vehicle.

An attachment means secures the backing structure 40, and thus the grille surround 20, to the vehicle 10. In the embodiment shown in FIGS. 3 and 4, a plurality of apertures 52 are formed in the backing structure 40. As shown in FIG. 6, a threaded insert 54 is inserted into each aperture 52. The threaded insert 54 in the illustrated embodiment is a well-nut, but any suitable insert can be used. Each aperture 52 in the backing structure 40 has a corresponding aperture 56 in the vehicle 10. A threaded fastener 58 extends through each aperture 56 in the vehicle 10 to threadedly engage the threaded insert 54 in the corresponding aperture 52 of the grille surround 20, thereby securing the grille surround 20 to the vehicle 10.

While the illustrated attachment means includes a plurality of threaded inserts 54 and threaded fasteners 58, it should be understood that any suitable attachment means can by used to secure the backing structure 40, and thus the grille surround 20, to the vehicle 10. In one alternate embodiment, the apertures 52 in the grille surround 20 are formed with threads therein, eliminating the need for threaded inserts. In another alternate embodiment, the attachment means includes a plurality of flexible clips extending rearward from the backing structure 40. As the grille surround 20 is mounted to the vehicle 10, the clips deform to pass through holes or slots in the vehicle and return to their original form when the grille surround is in a mounted position. When installed, the clips bear against the rear sides of the holes or slots to secure the grille surround 20 to the vehicle 10. Other known attachment means may be used provided that they have sufficient strength and durability to safely secure the grille surround 20 to the vehicle 10 under operating conditions.

Figure 7:
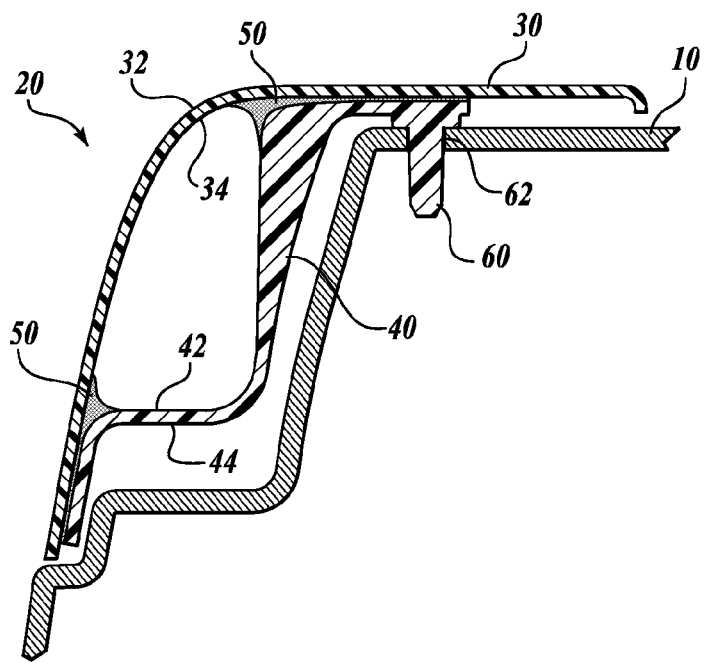
FIG. 7 is a cross-sectional view of the grille surround of FIG. 3 installed on a vehicle.

Referring back to FIG. 5, the illustrated embodiment includes a plurality of optional alignment pins 60 projecting rearwardly from the rear surface 44 of the backing structure 40. As shown in FIG. 7, when the grille surround 20 is installed, each of the alignment pins 60 extends through an alignment hole 62 located in the vehicle 10. As the grille surround 20 is being installed, the movement of the alignment pins 60 through the alignment holes 62 guides the grille surround 20 to ensure proper alignment. In addition, when the grille surround 20 is installed on the vehicle, the alignment pins provide additional support to the grille surround 20 and also help to reduce vibration of the grille surround 20 under operating conditions.

While illustrative embodiments have been illustrated and described, it will be appreciated that various changes can be made therein without departing from the spirit and scope of the invention.

The embodiments of the invention in which an exclusive property or privilege is claimed are defined as follows:

1. A grille surround adapted to surround at least a portion of the periphery of a vehicle grille, the grille surround comprising:
   (a) a shell formed from sheet metal to have one or more outwardly extending flanges, the one or more flanges having a shape to surround the portion of the periphery of the vehicle grille;
   (b) a backing structure, the backing structure including an attachment means for attaching the backing structure to a vehicle; and
   (c) an adhesive disposed between the shell and the backing structure to fixedly secure the shell to the backing structure.

2. The grille surround of claim 1, wherein at least a portion of the shell has a highly polished reflective surface.

3. The grille surround of claim 1, wherein the shell is formed by a process selected from the group consisting of stamping, stretch forming, and draw forming.

4. The grille surround of claim 1, wherein the backing structure comprises a polymeric material.

5. The grille surround of claim 1, wherein the backing structure is formed by a process selected from the group consisting of injection molding, machining, casting, forgoing, stamping, stretch forming, and draw forming.

6. The grille surround of claim 1, wherein the adhesive is selected from a group consisting of contact adhesives, thermoplastic adhesives, and reactive adhesives.

7. The grille surround of claim 1, wherein the attachment means is not visible from the outside of the vehicle.

8. The grille surround of claim 1, wherein the attachment means comprises a plurality of threaded fasteners adapted to engage a plurality of threaded inserts installed in the backing structure.

9. The grille surround of claim 1, wherein the attachment means comprises a plurality of threaded holes located in the backing structure.

10. The grille surround of claim 1, wherein the attachment means comprises a plurality of deformable clips capable of lockingly engaging the vehicle.

11. The grille surround of claim 1, further comprising a plurality of alignment pins extending rearwardly from the backing structure, said alignment pins being located to engage a plurality of alignment holes in the vehicle when the grille surround is attached to the vehicle.

\* \* \* \* \*

UNITED STATES PATENT AND TRADEMARK OFFICE
CERTIFICATE OF CORRECTION

| | | Page 1 of 1 |
|---|---|---|
| PATENT NO. | : 7,537,253 B2 | |
| APPLICATION NO. | : 11/863012 | |
| DATED | : May 26, 2009 | |
| INVENTOR(S) | : D. B. Rosen et al. | |

It is certified that error appears in the above-identified patent and that said Letters Patent is hereby corrected as shown below:

| COLUMN | LINE | ERROR |
|---|---|---|
| (57) Pg. 1, col. 2 | Abstract 1 of text | "(2)" should read --(20)-- |
| 6 (Claim 5, | 5 line 3) | "forgo-ing," should read -- forg-ing,-- |

Signed and Sealed this
Fourteenth Day of August, 2012

David J. Kappos
*Director of the United States Patent and Trademark Office*